US011884076B2

(12) United States Patent
Zhang et al.

(10) Patent No.: US 11,884,076 B2
(45) Date of Patent: Jan. 30, 2024

(54) FLUID MANAGEMENT SYSTEM FOR INKJET MACHINES

(71) Applicant: Applied Materials, Inc., Santa Clara, CA (US)

(72) Inventors: Daihua Zhang, Los Altos, CA (US); Kazuya Daito, Milpitas, CA (US); Kang Luo, Santa Clara, CA (US); Elsa Massonneau, Sunnyvale, CA (US); Alexey Stepanov, Sunnyvale, CA (US); Ludovic Godet, Sunnyvale, CA (US)

(73) Assignee: Applied Materials, Inc., Santa Clara, CA (US)

( * ) Notice: Subject to any disclaimer, the term of this patent is extended or adjusted under 35 U.S.C. 154(b) by 74 days.

(21) Appl. No.: 17/647,791

(22) Filed: Jan. 12, 2022

(65) Prior Publication Data

US 2022/0355589 A1 Nov. 10, 2022

Related U.S. Application Data

(60) Provisional application No. 63/186,321, filed on May 10, 2021.

(51) Int. Cl.
*B41J 2/165* (2006.01)
*B41J 2/18* (2006.01)

(52) U.S. Cl.
CPC ............. *B41J 2/16552* (2013.01); *B41J 2/18* (2013.01); *B41J 2002/16594* (2013.01)

(58) Field of Classification Search
CPC . B41J 2/16552; B41J 2/18; B41J 2002/16594
See application file for complete search history.

(56) References Cited

U.S. PATENT DOCUMENTS

2009/0040249 A1 2/2009 Wouters et al.
2010/0110155 A1* 5/2010 Delueg ...................... B41J 2/19 347/93
2016/0052291 A1* 2/2016 Pourtier .................. B41J 2/175 347/85

FOREIGN PATENT DOCUMENTS

CA 2683335 A1 * 4/2010 .............. B41J 2/175
EP 2292433 A1 3/2011

OTHER PUBLICATIONS

European Search Report issued to Patent Application No. 22156134.3 dated Jul. 7, 2022.

* cited by examiner

*Primary Examiner* — Sharon Polk
(74) *Attorney, Agent, or Firm* — Patterson + Sheridan, LLP

(57) ABSTRACT

Embodiments described herein provide for a fluid management system and a method of utilizing the fluid management system. The fluid management system includes a servicing fluid management system and an ink management system. The servicing fluid management system and the ink management system run in parallel within an inkjet chamber. The ink management system supports the flow of inkjet materials between a waste tank, one or more inkjet material supply tanks, an ink management module, and the inkjet printer. The servicing fluid management system supports the flow of servicing fluids between the waste tank, one or more servicing fluid supply tanks, a servicing fluid management module, and the inkjet printer.

18 Claims, 4 Drawing Sheets

FLUID MANAGEMENT SYSTEM FOR INKJET MACHINES

CROSS-REFERENCE TO RELATED APPLICATIONS

This application claims the benefit of U.S. Patent Application No. 63/186,321, filed May 10, 2021, which is herein incorporated by reference.

BACKGROUND

Field

Embodiments of the present disclosure generally relate to inkjet chambers. More specifically, embodiments described herein provide for a fluid management system and a method of utilizing the fluid management system.

Description of the Related Art

Virtual reality is generally considered to be a computer-generated simulated environment in which a user has an apparent physical presence. A virtual reality experience can be generated in 3D and viewed with a head-mounted display (HMD), such as glasses or other wearable display devices that have near-eye display panels as lenses to display a virtual reality environment that replaces an actual environment.

Augmented reality, however, enables an experience in which a user can still see through the display lenses of the glasses or other HMD device, or handheld device, to view the surrounding environment, yet also see images of virtual objects that are generated in the display and appear as part of the environment. Augmented reality can include any type of input, such as audio and haptic inputs, as well as virtual images, graphics, and video that enhances or augments the environment that the user experiences. As an emerging technology, there are many challenges and design constraints with augmented reality.

One such challenge is fabricating optical films and optical devices. Inkjet printing also enables the formation of the optical films or optical devices. However, existing inkjet printers lack desired management of inkjet materials and servicing fluids to ensure reliable printing operations. Accordingly, what is needed in the art are inkjet service stations with improved fluid management.

SUMMARY

In one embodiment, a fluid management system is provided. The fluid management system includes a waste tank disposed in a lower region of an inkjet chamber, one or more servicing fluid supply tanks disposed in the lower region, and an inkjet printer disposed in a processing region of the inkjet chamber. The inkjet printer includes a processing apparatus and an inkjet service station. The fluid management system further includes a servicing fluid supply line fluidly coupled between the one or more servicing fluid supply tanks and the inkjet printer and a servicing fluid return line fluidly coupled between the inkjet printer and the waste tank.

In another embodiment, a fluid management system is provided. The fluid management system includes a waste tank disposed in an inkjet chamber, one or more servicing fluid supply tanks disposed in the inkjet chamber, one or more inkjet material supply tanks disposed in the inkjet chamber, and an inkjet printer disposed in a processing region of the inkjet chamber, the inkjet printer includes a processing apparatus and an inkjet service station. The fluid management system further includes a servicing fluid management module operable to facilitate flow of servicing fluids. The servicing fluid management module includes a servicing fluid supply line fluidly coupled between the one or more servicing fluid supply tanks and the inkjet printer, a servicing fluid return line fluidly coupled between the inkjet printer and the waste tank, and an ink fluid management module operable to facilitate flow of inkjet materials. The ink fluid management module includes an ink supply line fluidly coupled between the one or more inkjet material supply tanks and the inkjet chamber, and an ink return line coupled between the inkjet printer and the waste tank.

In yet another embodiment, a method is provided. The method includes flowing inkjet materials to an inkjet printer. The inkjet materials are flowed through an ink supply line from one or more inkjet material supply tanks to an inkjet printer. The method further includes performing an inkjet printing process in the inkjet printer. The inkjet printing process includes depositing the inkjet materials to a substrate disposed in the inkjet printer. The method further includes recirculating the inkjet materials from the inkjet printer via an ink return line to the one or more inkjet material supply tanks and flowing servicing fluids to the inkjet printer. The servicing fluids are flowed through a servicing fluid supply line from one or more servicing fluid supply tanks to the inkjet printer. The method further includes performing servicing operations on the inkjet printer. The servicing fluids are collected in a catch tray of the inkjet printer during and after the servicing operations. The method further includes flowing the servicing fluids from the inkjet printer to a waste tank via a servicing fluid return line.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of scope, as the disclosure may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Embodiments of the present disclosure generally relate to inkjet chambers. More specifically, embodiments described herein provide for a fluid management system and a method of utilizing the fluid management system. The fluid management system is operable to manage servicing fluids and inkjet materials in parallel within the inkjet chamber.

In another embodiment, a fluid management system is provided. The fluid management system includes a waste tank disposed in an inkjet chamber, one or more servicing fluid supply tanks disposed in the inkjet chamber, one or more inkjet material supply tanks disposed in the inkjet chamber, and an inkjet printer disposed in a processing region of the inkjet chamber, the inkjet printer includes a processing apparatus and an inkjet service station. The fluid management system further includes a servicing fluid management module operable to facilitate flow of servicing fluids. The servicing fluid management module includes a servicing fluid supply line fluidly coupled between the one or more servicing fluid supply tanks and the inkjet printer, a servicing fluid return line fluidly coupled between the inkjet printer and the waste tank, and an ink fluid management module operable to facilitate flow of inkjet materials. The ink fluid management module includes an ink supply line fluidly coupled between the one or more inkjet material supply tanks and the inkjet chamber, and an ink return line coupled between the inkjet printer and the waste tank.

In yet another embodiment, a method is provided. The method includes flowing inkjet materials to an inkjet printer. The inkjet materials are flowed through an ink supply line from one or more inkjet material supply tanks to an inkjet printer. The method further includes performing an inkjet printing process in the inkjet printer. The inkjet printing process includes depositing the inkjet materials to a substrate disposed in the inkjet printer. The method further includes recirculating the inkjet materials from the inkjet printer via an ink return line to the one or more inkjet material supply tanks and flowing servicing fluids to the inkjet printer. The servicing fluids are flowed through a servicing fluid supply line from one or more servicing fluid supply tanks to the inkjet printer. The method further includes performing servicing operations on the inkjet printer. The servicing fluids are collected in a catch tray of the inkjet printer during and after the servicing operations. The method further includes flowing the servicing fluids from the inkjet printer to a waste tank via a servicing fluid return line.

Figure 1A:
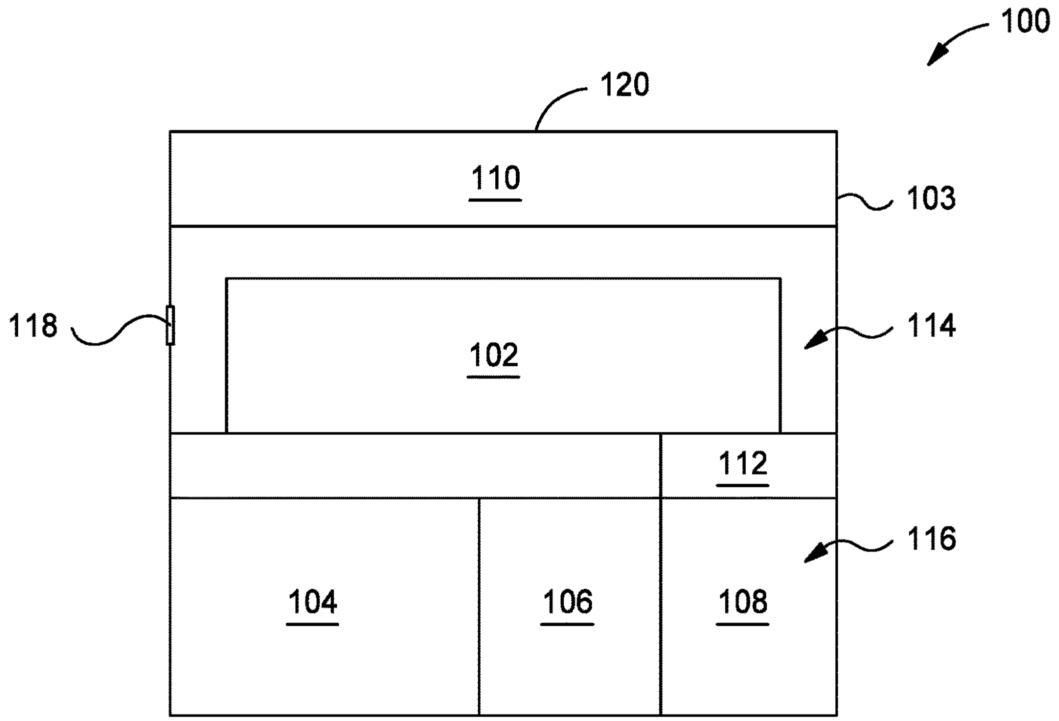
FIG. 1A is a schematic, front-view of an inkjet chamber according to embodiments.

FIG. 1A is a schematic, front-view of an inkjet chamber 100. The inkjet chamber 100 is operable to facilitate inkjet printing processes on a substrate 220 (shown in FIG. 2). For example, an optical device substrate may be positioned in the inkjet chamber 100 such that an inkjet printing process may be performed on the optical device substrate. The inkjet printing process enables selective coating of the substrate with an inkjet material to avoid contamination in sensitive areas of the substrate. The thickness of the inkjet material on the substrate 220 (shown in FIG. 2) may also be modulated with the inkjet printing process to form a thickness profile. Additionally, the inkjet printing process minimizes material usage when forming the optical films on the substrates.

The inkjet chamber 100 includes an enclosure 103. The enclosure 103 encloses an inkjet printer 102, one or more inkjet material supply tanks 104, one or more waste tanks 106, one or more servicing fluid supply tanks 108, a fan filter unit 110, and an exhaust port 112 within the inkjet chamber 100. The inkjet printer 102 and the fan filter unit 110 are disposed in a processing region 114 of the inkjet chamber. The inkjet printing process is performed with the inkjet printer 102 within the processing region 114. The exhaust port 112, the inkjet material supply tanks 104, the waste tank 106, and the servicing fluid supply tanks 108 are disposed in a lower region 116 of the inkjet chamber 100. The lower region 116 is disposed below the processing region 114. The enclosure 103 includes a slit valve 118 therethrough such that a transfer robot (not shown) may position the substrate 220 (shown in FIG. 2) in the processing region 114.

In some embodiments, which can be combined with other embodiments described herein, the inkjet chamber 100 may include a heat source, such as lamps or infrared generating radiant heaters, adapted to heat the substrate 220 (shown in FIG. 2) to a desired temperature. In another embodiment, which can be combined with other embodiments described herein, the inkjet chamber 100 can further be pressurized under a vacuum condition to ensure that any undesirable water or other contamination is removed from the surface of the substrate 220 (shown in FIG. 2) prior to processing.

The inkjet material supply tanks 104, the waste tank 106, and the servicing fluid supply tanks 108 are disposed in the lower region 116. The inkjet material supply tanks 104, the waste tank 106, and the servicing fluid supply tanks 108 may be removed, added, or positioned as needed within the lower region 116. One or more of the inkjet material supply tanks 104 may be disposed in the lower region. Each inkjet material supply tank 104 is operable to retain an inkjet material. Each inkjet material supply tank 104 is fluidly coupled to the inkjet printer 102 to deliver the inkjet materials. The inkjet materials may be utilized in the inkjet printing processes in the inkjet printer 102. The inkjet materials include, but are not limited to, acrylate, oil, water, or solvent based formulations, or combinations thereof.

One or more of the servicing fluid supply tanks 108 are disposed in the lower region 116. Each servicing fluid supply tank 108 is operable to retain a servicing fluid. The servicing fluids include, but are not limited to, water, such as deionized water, isopropyl alcohol, propylene glycol methyl ether acetate (PGMEA), or combinations thereof. Each servicing fluid supply tank 108 is fluidly coupled to the inkjet printer 102 to deliver the servicing fluids. The servicing fluids may be utilized for servicing operations on the inkjet printer 102. One or more waste tanks 106 may be disposed in the lower region 116. The one or more waste tanks 106 are operable to receive inkjet materials or servicing fluids from the inkjet printer 102.

The exhaust port 112 is disposed in the lower region 116. The exhaust port 112 is fluidly coupled to the processing region 114. The exhaust port 112 is operable to remove contaminants from the processing region 114 produced during processing. In one embodiment, which can be combined with other embodiments described herein, contaminants such as volatile organic compounds (VOCs) generated by the inkjet material or servicing materials are removed via the exhaust port 112. The processing region 114 is maintained at a negative pressure to avoid the contaminants leaking outside of the inkjet chamber 100.

The fan filter unit 110 is disposed in the processing region 114. The fan filter unit 110 is coupled to a top surface 120 of the enclosure 103. The fan filter unit 110 is operable to create a vertical flow of clean, dry air through the processing region 114. The fan filter unit 110 maintains the processing region 114 at a positive pressure to minimize air and particle intake from outside the inkjet chamber 100. The fan filter unit 110 and the exhaust port 112 provide independent pressure control in the processing region 114. The fan filter unit 110 and the exhaust port 112 provide for control of the processing region 114. The control of the processing region 114 ensures process quality and consistency when performing the inkjet printing process or servicing operations.

Figure 1B:
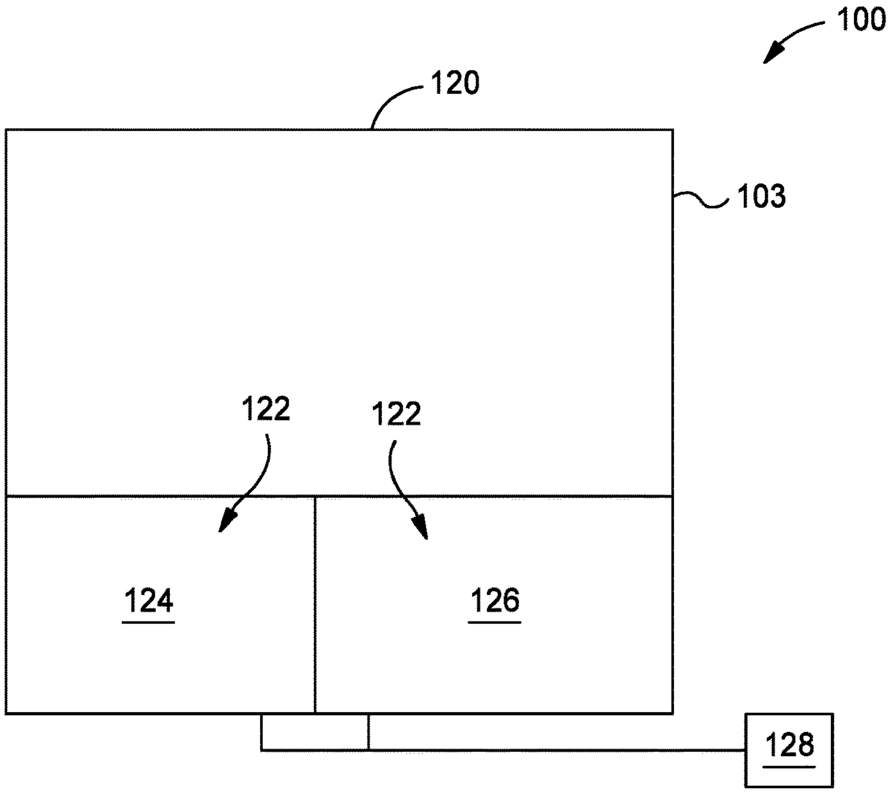
FIG. 1B is a schematic, back-view of an inkjet chamber according to embodiments.

FIG. 1B is a schematic, back-view of an inkjet chamber 100. As described above, the inkjet chamber 100 includes an enclosure 103. The enclosure 103 further includes a backside region 122. The backside region 122 is disposed opposite of the lower region 116. The backside region 122 includes a servicing fluid management module 124 and an ink management module 126. The servicing fluid management module 124 is in fluid communication with the waste tank 106, the servicing fluid supply tanks 108, and the inkjet printer 102. The ink management module 126 is in fluid communication with the inkjet material supply tanks 104, the waste tank 106, and the inkjet printer 102.

Although, the servicing fluid management module 124 and the ink management module 126 are disposed in the backside region 122, the servicing fluid management module 124 and the ink management module 126 may be disposed in the lower region 116. Similarly, although the inkjet material supply tanks 104, the waste tank 106, and the servicing fluid supply tanks 108 are disposed in the lower region 116, the inkjet material supply tanks 104, the waste tank 106, and the servicing fluid supply tanks 108 may be disposed in the backside region 122. The number of waste tanks 106 are not limited, and there may be more than one waste tank 106 in the inkjet chamber 100. For example, there may be one waste tank 106 operable to collect inkjet materials and one waste tank 106 operable to collect servicing fluids.

The servicing fluid management module 124 is operable to facilitate servicing operations. For example, the servicing fluid management module 124 is operable to facilitate the operation of the servicing operations such as at least one of printhead spitting, printhead purging, printhead flushing, printhead cleaning, printhead drying, or vacuum suction. The ink management module 126 is operable to facilitate the operation of the inkjet printing process. For example, the ink management module 126 is operable to facilitate inkjet material delivery and recirculation. The servicing fluid management module 124 may run in parallel with the ink management module 126. In one embodiment, which can be combined with other embodiments described herein, a controller 128 is in communication with the servicing fluid management module 124 and the ink management module 126. The controller 128 is generally designed to facilitate the control and automation of the inkjet printing process and the servicing operations.

Figure 2:
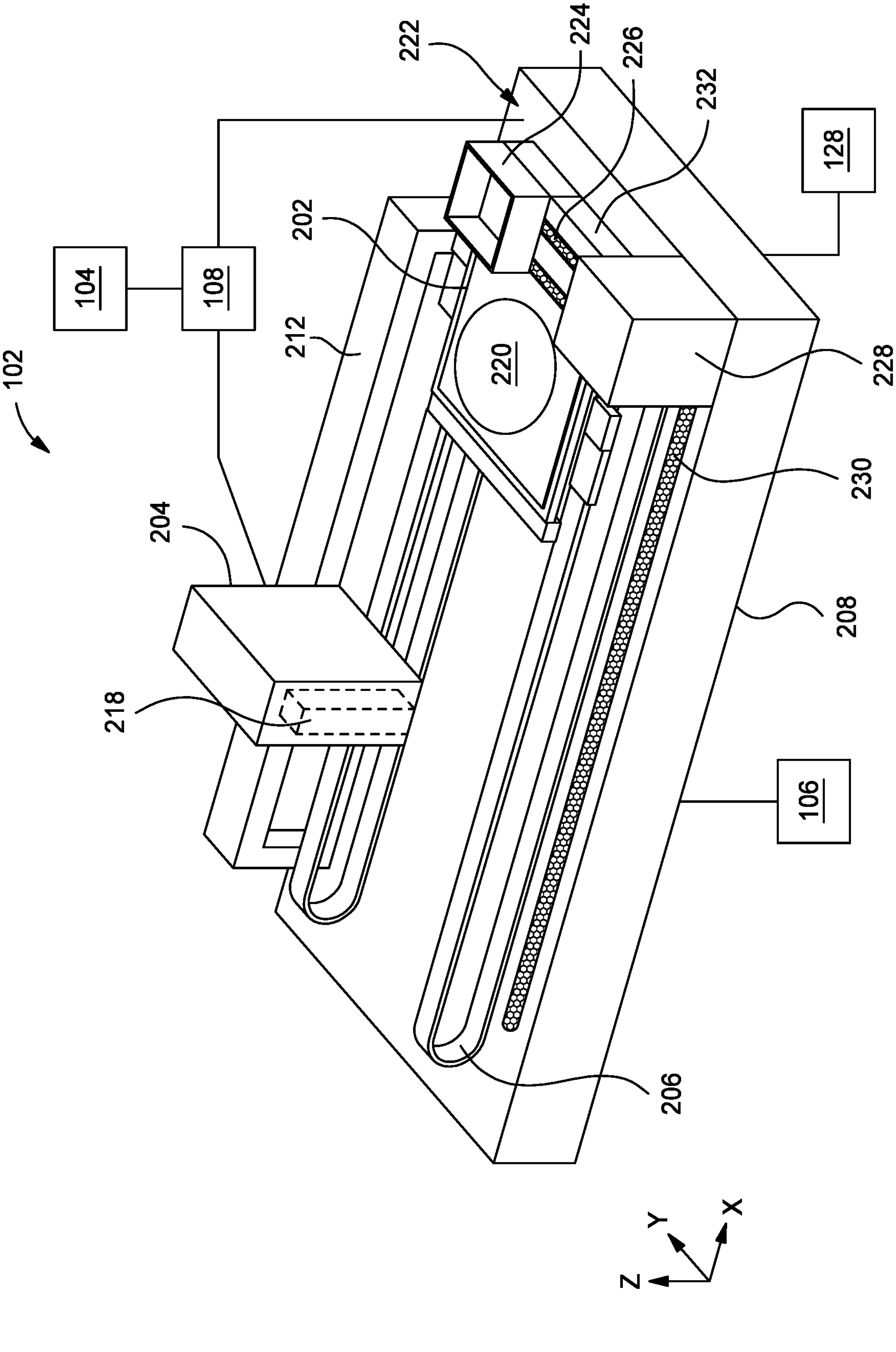
FIG. 2 is a schematic, side-view of an inkjet chamber according to embodiments.

FIG. 2 is a perspective view of an inkjet printer 102. The inkjet printer 102 is disposed in a processing region 114 (shown in FIG. 1A) of an inkjet chamber 100 (shown in FIGS. 1A and 1B). The inkjet printer 102 includes a stage 202, a processing apparatus 204, and an inkjet service station 222. The stage 202 is supported by a pair of tracks 206 disposed on a slab 208. The inkjet printer 102 is coupled to a controller 128. The controller 128 is generally designed to facilitate the control and automation of the inkjet printing process described herein.

A substrate 220 is supported by the stage 202. The inkjet printer 102 is operable to perform an inkjet printing process to print a film. For example, the inkjet printer 102 is operable to perform an inkjet printing process to form an optical film and/or an optical device. In one embodiment, which can be combined with other embodiments described herein, the substrate 220 is an optical device substrate. The substrate 220 is any suitable substrate on which an optical device or optical device film may be formed. The inkjet printing process performed in the inkjet printer 102 assists in the fabrication of at least one optical device or an optical film. It is to be understood that the at least one optical device described herein is an exemplary optical device and other optical devices may be used with or modified to accomplish aspects of the present disclosure. In one embodiment, which can be combined with other embodiments described herein, the optical device is a waveguide combiner. The waveguide combiner may be utilized for virtual, augmented, or mixed reality. In another embodiment, which can be combined with other embodiments described herein, the optical device is a micro-lens array. In another embodiment, which can be combined with other embodiments described herein, the optical device is utilized for prescription glasses. In yet another embodiment, which can be combined with other embodiments described herein, the optical device is a flat optical device, such as a metasurface.

The stage 202 moves along the pair of tracks 206 in at least one of an x direction, a y direction, or a z direction, as indicated by the coordinate system shown in FIG. 2. In one embodiment, the pair of tracks 206 is a pair of parallel magnetic channels. As shown, each track 206 of the pair of tracks 206 is linear. In other embodiments, the pair of tracks 206 may have a non-linear shape.

The processing apparatus 204 is coupled to a support 212. The processing apparatus 204 is disposed over the pair of tracks 206. The pair of tracks 206 and the stage 202 are operable to pass under the processing apparatus 204. The processing apparatus 204 is supported over the slab 208 by the support 212. The processing apparatus 204 is operable to distribute one or more inkjet materials onto the substrate 220. The substrate 220 is positioned on the stage 202 via a transfer robot (not shown).

The processing apparatus 204 is operable to distribute one or more inkjet materials onto the substrate 220. The processing apparatus 204 includes one or more printheads 218. One or more inkjet material supply tanks 104 disposed in the inkjet chamber 100 may be fluidly coupled to one of the plurality of printheads 218. The one or more printheads 218 are operable to deposit inkjet materials from the one or more inkjet material supply tanks 104 to the substrate 220. FIG. 2 only shows one printhead 218, the processing apparatus 204 is not limited in the number of printheads 218 in the processing apparatus 204. In one embodiment, which can be combined with other embodiments described herein, the one or more printheads 218 are operable to deposit one or more inkjet materials.

The inkjet service station 222 is disposed on the slab 208. The inkjet service station 222 is operable to provide servicing operations to the inkjet printer 102. The inkjet service station 222 includes a catch tray 224, a first slide rail 230, a second slide rail 226, a service stage 228, and a service stage extension 232. The catch tray 224 is coupled to the service stage 228 via the service stage extension 232. The second slide rail 226 is disposed along the service stage extension 232. The catch tray 224 is disposed on the second slide rail 226. The catch tray 224 is operable to move along the second slide rail 226. The second slide rail 226 provides for the catch tray 224 to move in the y direction. The first slide rail 230 is disposed along the slab 208. The service stage 228 is disposed on the first slide rail 230. The service stage 228 is operable to move along the first slide rail 230. The first slide rail 230 provides for the service stage 228 to move in the x direction. Therefore, the inkjet service station 222 is operable to move the catch tray 224 in one or both of the x direction and the y direction. In one embodiment, which can be combined with other embodiments described herein, the service stage 228 is operable to move the service stage extension 232 and the catch tray 224 in the z direction.

One or more servicing fluid supply tanks 108 disposed in the inkjet chamber 100 may be fluidly coupled to one of the inkjet service station 222. The one or more servicing fluid supply tanks 108 are operable to supply service fluids utilized in the servicing operations. One or more waste tanks 106 disposed in the inkjet chamber 100 may be fluidly coupled to the processing apparatus 204 and/or the inkjet service station 222 to collect the excess inkjet materials and servicing fluids.

The catch tray 224 is operable to be positioned below the processing apparatus 204 during servicing operations. Specifically, the catch tray 224 is operable to be positioned below the one or more printheads 218 in the processing apparatus 204. The catch tray 224 is operable to collect liquids deposited from the one or more printheads 218. The catch tray 224 is in a work position when disposed under the processing apparatus 204. The catch tray 224 is in the work position when the catch tray 224 is positioned such that the inkjet service station 222 is operable to perform the servicing operations under the processing apparatus 204. The catch tray 224 is in a park position when not performing servicing operations. The catch tray 224 is in the park positon when away from the processing apparatus 204. The catch tray 224 is in the park positon as shown in FIG. 2.

Figure 3:
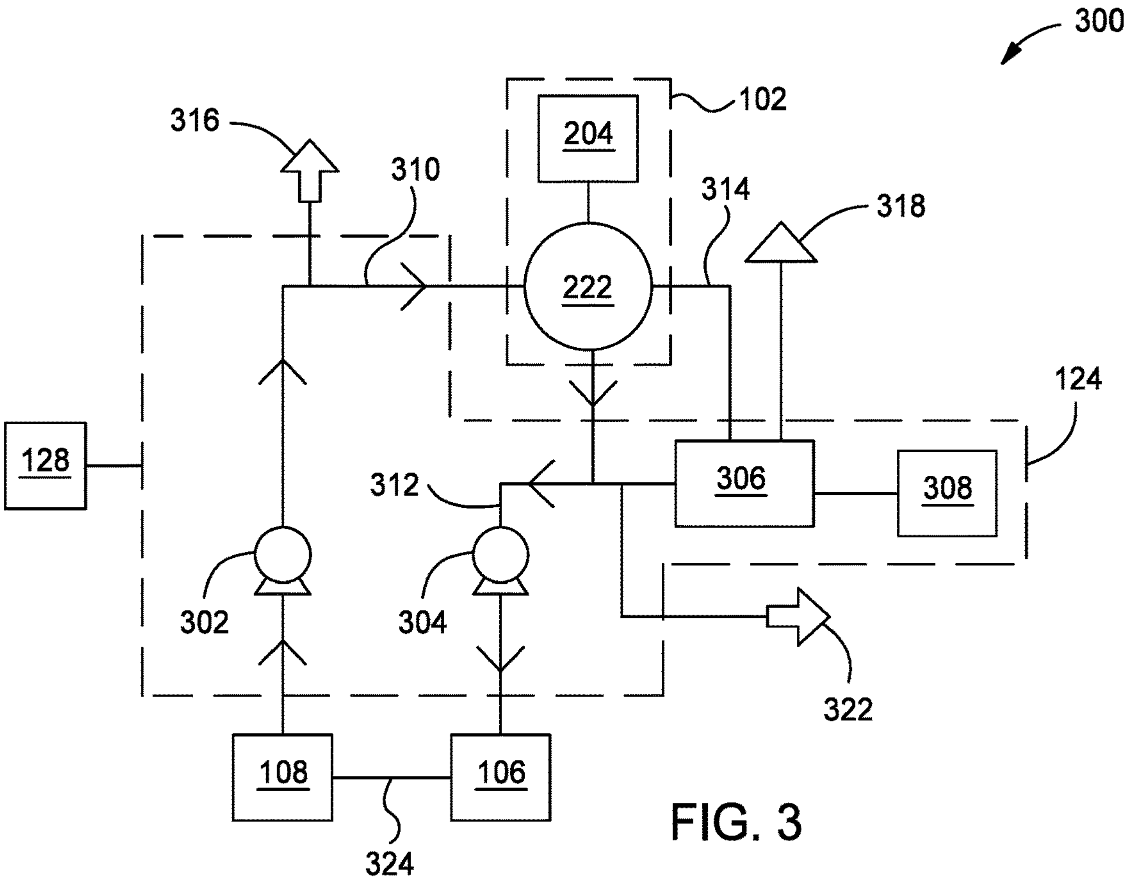
FIG. 3 is a schematic diagram of a servicing fluid management system according to embodiments.

FIG. 3 is a schematic diagram of a servicing fluid management system 300. The servicing fluid management system 300 includes one or more waste tanks 106, one or more servicing fluid supply tanks 108, a servicing fluid management module 124, and an inkjet printer 102. The servicing fluid management system 300 is operable to facilitate the flow of servicing fluids between the waste tank 106, the one or more servicing fluid supply tanks 108, the servicing fluid management module 124, and the inkjet printer 102. In one embodiment, which can be combined with other embodiments described herein, the servicing fluid management system 300 may also facilitate vacuum operations of the servicing operations in the inkjet printer 102. In another embodiment, which can be combined with other embodiments described herein, the servicing fluid management system 300 may also facilitate the flow of clean dry air (CDA) and inkjet materials between the waste tank 106, one or more servicing fluid supply tanks 108, a servicing fluid management module 124, and the inkjet printer 102. For example, the CDA is stored in the servicing fluid supply tanks 108. The CDA can be flowed to the inkjet printer 102 to drive out fluids in the inkjet printer 102 to the waste tank 106. The fluid management system 300 may remove residual inkjet materials in the ink supply line 406 and the ink return line 408 of the ink management system 400 (shown in FIG. 4).

The servicing fluid management module 124 includes a supply pump 302, a return pump 304, a liquid trap tank 306, a vacuum source 308, a servicing fluid supply line 310, a servicing fluid return line 312, and a vacuum line 314. In some embodiments, which may be combined with other embodiments described herein, the servicing fluid management module 124 includes one or more of manual valves, pneumatic valves, regulators, filters, flow restrictors, pressure gauges, check valves, solenoid valves, flow sensors, and level sensors disposed along one or more of the servicing fluid supply line 310, the servicing fluid return line 312, and the vacuum line 314 to facilitate or alter the movement of the servicing fluids.

The servicing fluid supply line 310 is coupled between the one or more servicing fluid supply tanks 108 and the inkjet printer 102. The supply pump 302 is disposed along the servicing fluid supply line 310. The supply pump 302 is operable to pump the servicing fluids in the one or more servicing fluid supply tanks 108 to the inkjet printer 102 such that servicing operations may be performed. The servicing fluid return line 312 is coupled between the inkjet printer 102 and the waste tank 106. The return pump 304 is disposed along the servicing fluid return line 312. The return pump 304 is operable to pump the servicing fluids from the inkjet printer 102 to the waste tank 106. In one embodiment, which can be combined with other embodiments described herein, the return pump 304 is operable to drain inkjet materials from the inkjet printer 102. The waste tank 106 may either be replaced or emptied to remove the servicing fluids.

In one embodiment, which can be combined with other embodiments described herein, the servicing fluids in the servicing fluid supply line 310 may be in fluid communication with one or more flush valves 316. The one or more flush valves 316 may be opened to remove the servicing fluids from the servicing fluid supply line 310. In another embodiment, which can be combined with other embodiments described herein, inkjet materials within the servicing fluid return line 312 may be in fluid communication with one or more ink drain ports 322. The one or more ink drain ports 322 may be opened to remove the inkjet materials or servicing fluids from the servicing fluid return line 312. The one or more ink drain ports 322 may be disposed in the ink management module 126.

The inkjet printer 102 includes a processing apparatus 204 and an inkjet service station 222. The servicing fluids from the servicing fluid supply tanks 108 are provided to one or both of the inkjet service station 222 and the processing apparatus 204. The servicing fluids are provided to the inkjet service station 222 and the processing apparatus 204 such that servicing operations may be performed. For example, the servicing fluids may be flowed to the processing apparatus 204 to perform a flushing operation with the servicing fluids. The servicing fluids and excess inkjet materials are collected in a catch tray 224 (shown in FIG. 2) of the inkjet service station and returned to the waste tank 106. In one embodiment, which can be combined with other embodiments described herein, the servicing fluids may be recirculated from the waste tank 106 back to the one or more servicing fluid supply tanks 108 via a servicing fluid recirculation line 324. The servicing fluid recirculation line 324 is coupled between the waste tank 106 and the one or more servicing fluid supply tanks 108.

The vacuum line 314 is coupled between the inkjet printer 102 and the vacuum source 308. The liquid trap tank 306 is disposed along the vacuum line 314. The vacuum source 308 is operable to provide a vacuum force through the vacuum line 314. For example, the vacuum line 314 may provide a vacuum force to the inkjet service station 222 to utilize in servicing operations. The liquid trap tank 306 is operable to trap servicing fluid and/or inkjet materials in the vacuum line 314. The liquid trap tank 306 prevents servicing fluids and inkjet materials from entering the vacuum line 314. The servicing fluid return line 312 is fluidly coupled to the liquid trap tank 306 such that the collected servicing fluids may flow to the waste tank 106.

In one embodiment, which can be combined with other embodiments described herein, a hand-held suction head 318 is disposed along the vacuum line 314. The vacuum line 314 is operable to provide a vacuum force to the hand-held suction head 318. The hand-held suction head 318 is operable to be utilized in servicing operations conducted manually with the hand-held suction head 318.

In one embodiment, which can be combined with other embodiments described herein, the servicing fluid management module 124 further includes one or more of the manual valves, the pneumatic valves, the regulators, the filters, the flow restrictors, the pressure gauges, the check valves, the solenoid valves, the flow sensors, and the level sensors disposed along one or more of the servicing fluid supply line 310, the servicing fluid return line 312, and the vacuum line 314 to facilitate and support the flow of the servicing fluids. The manual valves, the pneumatic valves, the regulators, the filters, the flow restrictors, the pressure gauges, the check valves, the solenoid valves, the flow sensors, and the level sensors may be in communication with a controller 128 to facilitate the operations along the servicing fluid supply line 310, the servicing fluid return line 312, and the vacuum line 314. The number of the manual valves, the pneumatic valves, the regulators, the filters, the flow restrictors, the pressure gauges, the check valves, the solenoid valves, the flow sensors, and the level sensors is not limited. The manual valves, the pneumatic valves, the regulators, the filters, the flow restrictors, the pressure gauges, the check valves, the solenoid valves, the flow sensors, and the level sensors may be positioned as needed along the servicing fluid supply line 310, the servicing fluid return line 312, and the vacuum line 314.

Figure 4:
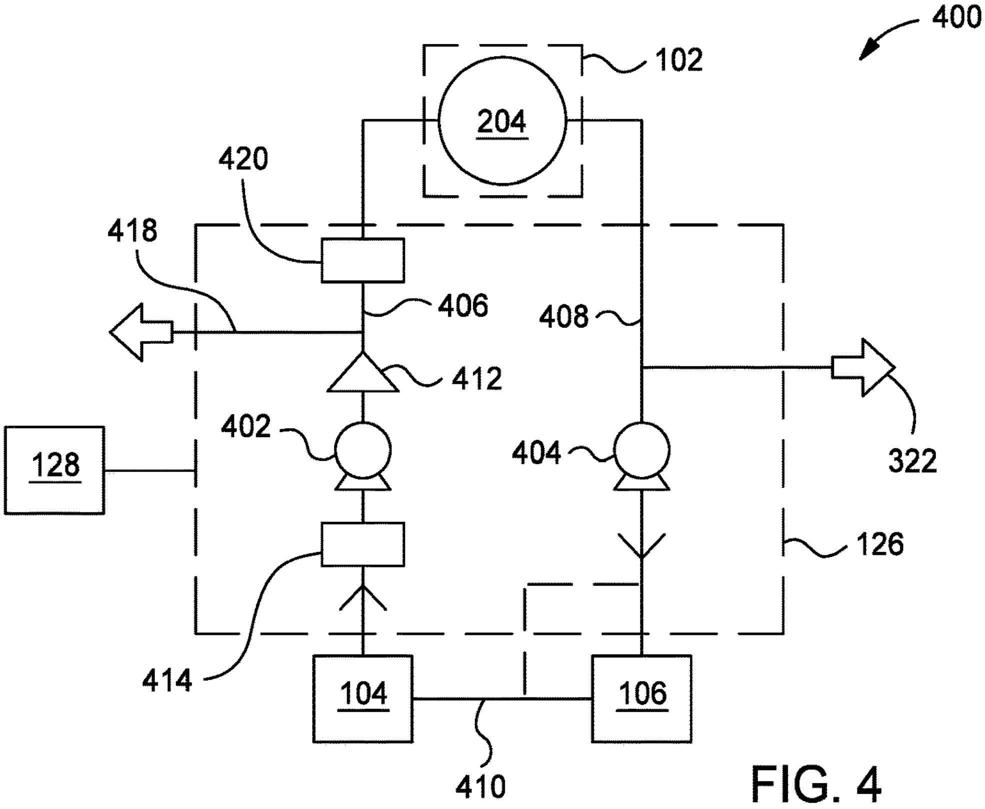
FIG. 4 is a schematic diagram of an ink management system according to embodiments.

FIG. 4 is a schematic diagram of an ink management system 400. The ink management system 400 includes a waste tank 106, inkjet material supply tanks 104, an ink management module 126, and an inkjet printer 102. The ink management system 400 is operable to facilitate the transfer of inkjet materials between the waste tank 106, the inkjet material supply tanks 104, the ink management module 126, and the inkjet printer 102. The servicing fluid management system 300 and the ink management system 400 run in parallel within the inkjet chamber 100. In combination, the ink management system 400 and the servicing fluid management system 300 form a fluid management system.

The ink management module 126 includes an ink supply pump 402, an ink return pump 404, an ink supply line 406, an ink return line 408, an ink heater 420, a check valve 412, and one or more degassing ports 418. In some embodiments, which may be combined with other embodiments described herein, the ink management module 126 includes one or more of manual valves, pneumatic valves, regulators, filters e.g., the filter 414, flow restrictors, pressure gauges, check valves e.g., the check valve 412, solenoid valves, flow sensors, and level sensors disposed along one or more of the ink supply line 406 or the ink return line 408 to facilitate or alter the movement of the inkjet materials.

As shown in FIG. 4, the ink heater 420 is disposed along the ink supply line 406. The ink heater 420 is configured to heat the inkjet materials prior to entering the processing apparatus 204. The check valve 412 is also disposed along the ink supply line 406. The check valve 412 prevents the inkjet material from flowing back to the one or more inkjet material supply tanks 104. The filter 414 is disposed along the ink supply line 406. The filter 414 removes contaminants from the inkjet materials flowing through the ink supply line 406. The ink supply line 406 may include more than one filter 414.

In some embodiments, which can be combined with other embodiments described herein, one or more ink drain ports 322, as shown in FIG. 3, may be disposed in the ink management module 126. Some inkjet materials within the ink return line 408 may be in fluid communication with one or more ink drain ports 322. The one or more ink drain ports 322 may be opened to remove the ink from the ink return line 408.

In some embodiments, which can be combined with other embodiments described herein, one or more degassing ports 418, as shown in FIG. 3, may be disposed in the ink management module 126. The degassing ports 418 may be disposed along the ink supply line 406. The inkjet materials within the ink supply line 406 may flow through the one or more degassing ports 418. The one or more degassing ports 418 are operable to remove gas bubbles from the inkjet materials flowing through the ink supply line 406.

The ink supply line 406 is coupled between the one or more inkjet material supply tanks 104 and the inkjet printer 102. The ink supply pump 402 is disposed along the ink supply line 406. The ink supply pump 402 is operable to pump the inkjet materials in the one or more inkjet material supply tanks 104 to the inkjet printer 102 such that inkjet printing processes may be performed. The ink return line 408 is coupled between the inkjet printer 102 and the waste tank 106. The ink return pump 404 is disposed along the ink return line 408. The ink return pump 404 is operable to pump the inkjet materials from the inkjet printer 102 to the waste tank 106. The waste tank 106 may either be replaced or emptied to remove the inkjet materials.

In some embodiments, which can be combined with other embodiments described herein, the ink supply pump 402 and the ink return pump 404 can be replaced with the supply pump 302 and the return pump 304, shown in FIG. 3. In other embodiments, the supply pump 302 and the return pump 304 can be replaced with the ink supply pump 402 and the ink return pump 404. Therefore, the ink management system 400 and the servicing fluid management system 300 can share the return pumps and supply pumps. The operation of the ink management system 400 and the servicing fluid management system 300 increases in efficiency by sharing the supply pump 302 and the return pump 304 or the ink supply pump 402 and the ink return pump 404. Further, the ink management system 400 and the servicing fluid management system 300 can share a compressed air source. Additionally, the ink drain ports 322 of the ink management system 400 and the servicing fluid management system 300 are shared. In other embodiments, the waste tank 106 is shared between the ink management system 400 and the servicing fluid management system 300. By sharing components between the ink management system 400 and the servicing fluid management system 300, the inkjet chamber 100 is more compact, reducing the area required for the inkjet chamber 100.

The inkjet printer 102 includes a processing apparatus 204. The inkjet materials from the inkjet material supply tanks 104 are provided to the processing apparatus 204. The inkjet materials are provided to the processing apparatus 204 such that inkjet printing processes may be performed. In one embodiment, which can be combined with other embodiments described herein, excess inkjet materials not utilized during the inkjet printing process are returned to the waste tank 106. In another embodiment, which can be combined with other embodiments described herein, the inkjet material may be recirculated from the waste tank 106 back to the one or more inkjet material supply tanks 104 via an ink recirculation line 410. The ink recirculation line 410 is coupled between the waste tank 106 and the one or more inkjet material supply tanks 104. In yet another embodiment, which can be combined with other embodiments described herein, the ink return line 408 my provide the inkjet materials directly to the ink recirculation line 410 and bypass the waste tank 106.

In one embodiment, which can be combined with other embodiments described herein, the ink management module 126 further includes one or more of the manual valves, the pneumatic valves, the regulators, the filters, the flow restrictors, the pressure gauges, the check valves, the solenoid valves, the flow sensors, and the level sensors disposed along one or more of the ink supply line 406 and the ink return line 408 to facilitate and support the movement of the servicing fluids. The manual valves, the pneumatic valves, the regulators, the filters, the flow restrictors, the pressure gauges, the check valves, the solenoid valves, the flow sensors, and the level sensors may be in communication with a controller 128 to facilitate the operations along the ink supply line 406 and the ink return line 408. The number of the manual valves, the pneumatic valves, the regulators, the filters, the flow restrictors, the pressure gauges, the check valves, the solenoid valves, the flow sensors, and the level sensors is not limited. The manual valves, the pneumatic valves, the regulators, the filters, the flow restrictors, the pressure gauges, the check valves, the solenoid valves, the flow sensors, and the level sensors may be positioned as needed along the ink supply line 406 and the ink return line 408.

Figure 5:
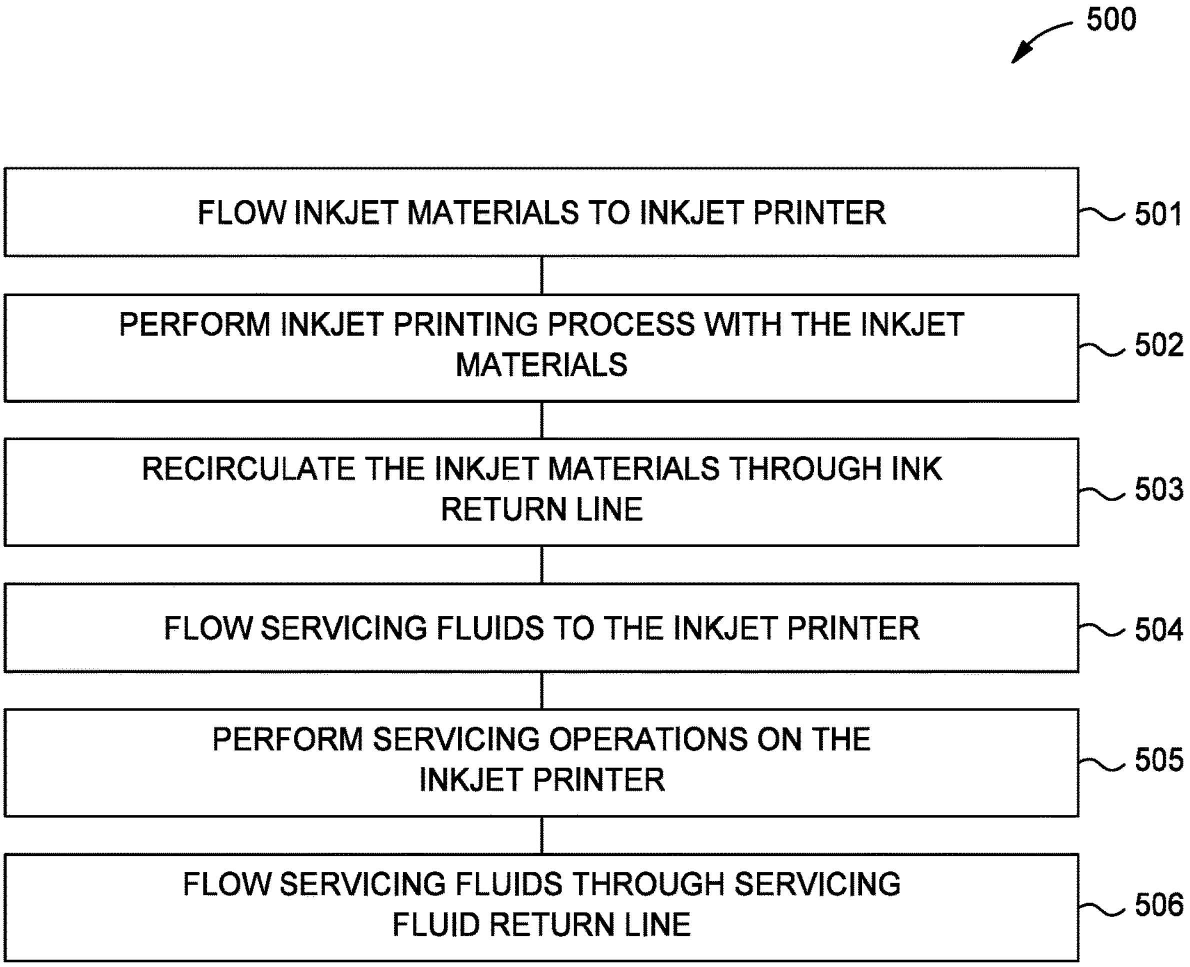
FIG. 5 is a flow diagram of a method managing fluids with a fluid management system according to embodiments.

FIG. 5 is a flow diagram of a method managing fluids with a fluid management system. To facilitate explanation, the method 500 will be described with reference to FIG. 3 and FIG. 4. The method 500 is operable to manage inkjet materials and servicing fluids in an inkjet chamber 100 (shown in FIG. 1) such that inkjet printing processes and servicing operations may be performed. The method 500 includes a servicing fluid management system 300 and an ink management system 400.

The servicing fluid management system 300 and the ink management system 400 run in parallel within the inkjet chamber 100. The servicing fluid management system 300 and the ink management system 400 run in parallel to improve the overall quality of the optical film and/or the optical device to be formed. Integrating the servicing fluid management system 300 and the ink management system 400 allows for the inkjet materials to be provided to the substrate 220 while the servicing operations can be efficiently conducted before, concurrently, or after the inkjet printing process. As the servicing fluid management system 300 is fully integrated with the inkjet chamber 100, the servicing operations are completed without having to modify the inkjet chamber 100. The servicing operations are completed efficiently and with precision. The precision of the servicing operations due to the integrated servicing fluid management system 300 improves overall quality of the optical films and optical devices. As the servicing operations can be run more frequently, the performance of the inkjet printing process is improved as serving operations maintain the precision and condition of the inkjet chamber 100. Further, as the servicing fluid management system 300 and the ink management system 400 run in parallel with various shared components, the size and cost of the inkjet chamber 100 is decreased. Therefore, inkjet materials and servicing fluids are independently managed such that print quality, consistency, and machine run times are improved. In combination, the ink management system 400 and the servicing fluid management system 300 form a fluid management system.

At operation 501, inkjet materials are flowed to an inkjet printer 102. The inkjet materials are stored in one or more inkjet material supply tanks 104. The one or more inkjet material supply tanks 104 are in fluid communication with an ink supply line 406. An ink supply pump 402 flows the inkjet materials along the ink supply line 406 to a processing apparatus 204 of the inkjet printer 102.

At operation 502, an inkjet printing process is performed with the inkjet materials. The inkjet materials are operable to be deposited during an inkjet printing process to a substrate 220 (shown in FIG. 2).

At operation 503, the inkjet materials are recirculated through an ink return line 408. An ink return pump 404 flows the inkjet materials along the ink return line 408. Excess inkjet materials not utilized during the inkjet printing process may be returned to the waste tank 106, recirculated from the waste tank 106 back to the one or more inkjet material supply tanks 104 via an ink recirculation line 410, or provided directly to the ink recirculation line 410 and bypass the waste tank 106 to return to the one or more inkjet material supply tanks 104. Circulation of the inkjet materials prevents clogging within the inkjet printer 102.

At operation 504, servicing fluids are flowed to the inkjet printer 102. The servicing fluids are stored in one or more servicing fluid supply tanks 108. The one or more servicing fluid supply tanks 108 are in fluid communication with a servicing fluid supply line 310. A supply pump 302 flows the servicing fluids along the servicing fluid supply line 310 to the processing apparatus 204 and an inkjet service station 222 of the inkjet printer 102. In one embodiment, which can be combined with other embodiments described herein, a vacuum line 314 is in fluid communication with the inkjet service station 222 to provide a vacuum force from a vacuum source 308 coupled to the vacuum line 314.

At operation 505, servicing operations are performed on the inkjet printer 102. For example, servicing operations such as at least one of printhead spitting, printhead purging, printhead flushing, printhead cleaning, printhead drying, or vacuum suction are performed on the processing apparatus 204 with the servicing fluids. The used servicing fluids are collected in a catch tray 224 (shown in FIG. 2) during and after the servicing operations.

At operation 506, the servicing fluids are flowed through a servicing fluid return line 312. A return pump 304 flows the servicing fluids along the servicing fluid return line 312. The servicing fluids are returned to the waste tank 106. In one embodiment, which can be combined with other embodiments described herein, the servicing fluids may be recirculated from the waste tank 106 back to the one or more servicing fluid supply tanks 108 via a servicing fluid recirculation line 324. In another embodiment, which can be combined with other embodiments described herein, the servicing fluids that are in the vacuum line 314 are trapped by a liquid trap tank 306 and flowed to the waste tank 106. The waste tank 106 may either be replaced or emptied to remove the servicing fluids and inkjet materials in the waste tank 106. Management of the servicing fluids ensures clean and uncontaminated servicing fluids that may be utilized to service the processing apparatus 204. In one embodiment, which can be combined with other embodiments described herein, the inkjet material is recirculating through inkjet printer 102 concurrently while the servicing fluid is collected in the waste tank 106.

In summation, a fluid management system and a method of utilizing the fluid management system are described herein. The fluid management system includes a servicing fluid management system and an ink management system. The servicing fluid management system and the ink management system run in parallel within an inkjet chamber.

Therefore, inkjet materials and servicing fluids are independently managed such that print quality, consistency, and machine run times are improved for inkjet printing processes. The ink management system supports the flow of inkjet materials between a waste tank, one or more inkjet material supply tanks, an ink management module, and the inkjet printer. The servicing fluid management system supports the flow of servicing fluids between the waste tank, one or more servicing fluid supply tanks, a servicing fluid management module, and the inkjet printer.

While the foregoing is directed to embodiments of the present disclosure, other and further embodiments of the disclosure may be devised without departing from the basic scope thereof, and the scope thereof is determined by the claims that follow.

What is claimed is:

1. A fluid management system, comprising:
a waste tank disposed in a lower region of an inkjet chamber;
a servicing fluid supply tank disposed in the lower region;
a inkjet material supply tank disposed in the lower region;
an inkjet printer disposed in a processing region of the inkjet chamber, the inkjet printer comprising:
a processing apparatus; and
an inkjet service station;
a servicing fluid supply line fluidly coupled between the servicing fluid supply tank and the inkjet service station of the inkjet printer;
a servicing fluid return line fluidly coupled between the inkjet service station of the inkjet printer and the waste tank;
a servicing fluid recirculation line fluidly coupled to the waste tank and the servicing fluid supply tank;
an ink supply line fluidly coupled between the inkjet material supply tank and the processing apparatus of the inkjet printer;
an ink return line fluidly coupled between the processing apparatus of the inkjet printer and the waste tank; and
an ink recirculation line fluidly coupled to the waste tank and the inkjet material supply tank.

2. The fluid management system of claim 1, further comprising a vacuum line coupled between the inkjet printer and a vacuum source.

3. The fluid management system of claim 2, further comprising a liquid trap tank disposed on the vacuum line, the servicing fluid return line fluidly coupled to the liquid trap tank.

4. The fluid management system of claim 1, further comprising:
a supply pump disposed on the servicing fluid supply line; and
a return pump disposed on the servicing fluid return line.

5. The fluid management system of claim 4, wherein:
the supply pump is operable to flow a servicing fluid from the one or more servicing fluid supply tanks to the inkjet printer; and
the return pump is operable to flow the servicing fluid from the inkjet printer to the waste tank.

6. The fluid management system of claim 1, further comprising one or more flush valves in fluid communication with the servicing fluid supply line.

7. The fluid management system of claim 1, wherein one or more of manual valves, pneumatic valves, regulators, filters, flow restrictors, pressure gauges, check valves, solenoid valves, flow sensors, and level sensors are disposed along the servicing fluid supply line and the servicing fluid return line.

8. A fluid management system, comprising:
a waste tank disposed in an inkjet chamber;
one or more servicing fluid supply tanks disposed in the inkjet chamber;
one or more inkjet material supply tanks disposed in the inkjet chamber;
an inkjet printer disposed in a processing region of the inkjet chamber, the inkjet printer comprising:
a processing apparatus; and
an inkjet service station;
a servicing fluid management module operable to facilitate flow of servicing fluids, comprising:
a servicing fluid recirculation line fluidly coupled to the waste tank and the one or more servicing fluid supply tanks;
a servicing fluid supply line fluidly coupled between the one or more servicing fluid supply tanks and the inkjet printer; and
a servicing fluid return line fluidly coupled between the inkjet printer and the waste tank; and
an ink fluid management module operable to facilitate flow of inkjet materials, comprising:
an ink recirculation line fluidly coupled to the waste tank and the one or more inkjet material supply tanks;
an ink supply line fluidly coupled between the one or more inkjet material supply tanks and the inkjet chamber; and
an ink return line coupled between the inkjet printer and the waste tank.

9. The fluid management system of claim 8, further comprising a vacuum line coupled between the inkjet printer and a vacuum source.

10. The fluid management system of claim 9, further comprising a liquid trap tank disposed on the vacuum line, the servicing fluid return line fluidly coupled to the liquid trap tank.

11. The fluid management system of claim 8, further comprising:
a supply pump disposed on the servicing fluid supply line; and
a return pump disposed on the servicing fluid return line.

12. The fluid management system of claim 11, wherein:
the supply pump is operable to flow a servicing fluid from the one or more servicing fluid supply tanks to the inkjet printer; and
the return pump is operable to flow the servicing fluid from the inkjet printer to the waste tank.

13. The fluid management system of claim 8, further comprising one or more flush valves in fluid communication with the servicing fluid supply line.

14. The fluid management system of claim 8, wherein one or more of manual valves, pneumatic valves, regulators, filters, flow restrictors, pressure gauges, check valves, solenoid valves, flow sensors, and level sensors are disposed along the servicing fluid supply line and the servicing fluid return line.

15. A method, comprising:
flowing inkjet materials to an inkjet printer, the inkjet materials flowed through an ink supply line from one or more inkjet material supply tanks to an inkjet printer;
performing an inkjet printing process in the inkjet printer, the inkjet printing process including depositing the inkjet materials to a substrate disposed in the inkjet printer;
recirculating the inkjet materials from the inkjet printer via an ink return line to a waste tank and to the one or more inkjet material supply tanks from an ink recirculation line fluidly coupled to the waste tank;

flowing servicing fluids to the inkjet printer, the servicing fluids flowed through a servicing fluid supply line from one or more servicing fluid supply tanks to the inkjet printer;

performing servicing operations on the inkjet printer, wherein the servicing fluids are collected in a catch tray of the inkjet printer during and after the servicing operations;

flowing the servicing fluids from the inkjet printer to the waste tank via a servicing fluid return line; and recirculating the servicing fluids in the waste tank to the one or more servicing fluid supply tanks via a servicing fluid recirculation line, the servicing fluid recirculation line is coupled between the waste tank and the one or more servicing fluid supply tanks.

16. The method of claim 15, where the servicing operations include at least one of printhead spitting, printhead purging, printhead flushing, printhead cleaning, printhead drying, or vacuum suctioning.

17. The method of claim 15, wherein the performing servicing operations on the inkjet printer further includes providing a vacuum force via a vacuum source such that the servicing fluids collected via the vacuum force are collected in a fluid trap tank in fluid communication with the servicing fluid return line.

18. The method of claim 15, wherein the inkjet material is recirculating through the inkjet printer concurrently while the servicing fluids are collected in the waste tank.

* * * * *